US011400688B1

(12) United States Patent
Ripley et al.

(10) Patent No.: US 11,400,688 B1
(45) Date of Patent: Aug. 2, 2022

(54) THERMAL PROTECTION BARRIER

(71) Applicants: Consolidated Nuclear Security, LLC, Oak Ridge, TN (US); Patricia Duerksen, Norris, TN (US)

(72) Inventors: Edward B. Ripley, Knoxville, TN (US); Jacob L. Miller, Oliver Springs, TN (US); Michael J. Renner, Oak Ridge, TN (US); Walter Duerksen, Norris, TN (US); Jonathan S. Morrell, Knoxville, TN (US)

(73) Assignee: Consolidated Nuclear Security, LLC, Oak Ridge, TN (US)

( * ) Notice: Subject to any disclaimer, the term of this patent is extended or adjusted under 35 U.S.C. 154(b) by 0 days.

(21) Appl. No.: 16/857,668

(22) Filed: Apr. 24, 2020

Related U.S. Application Data

(63) Continuation-in-part of application No. 15/994,055, filed on May 31, 2018, now Pat. No. 10,655,939.
(Continued)

(51) Int. Cl.
*B32B 5/30* (2006.01)
*B32B 33/00* (2006.01)
*B32B 5/24* (2006.01)
*B32B 15/04* (2006.01)
*B32B 3/26* (2006.01)

(52) U.S. Cl.
CPC ............... *B32B 5/30* (2013.01); *B32B 3/266* (2013.01); *B32B 5/245* (2013.01); *B32B 15/046* (2013.01);
(Continued)

(58) Field of Classification Search
CPC .................................. B32B 5/30; B32B 3/266
See application file for complete search history.

(56) References Cited

U.S. PATENT DOCUMENTS 4,596,725 A * 6/1986 Kluth ..................... C08G 18/10
427/385.5
5,750,927 A 5/1998 Baltazar
(Continued)

FOREIGN PATENT DOCUMENTS

WO 2011104501 A2 9/2011

OTHER PUBLICATIONS

Chaudhuri, Bodhisattwa, Experimentally Validated Numerical Modeling of Heat Transfer in Granular Flow in Rotating Vessels, Feb. 14, 2011.
(Continued)

*Primary Examiner* — Tong Guo
(74) *Attorney, Agent, or Firm* — Luedeka Neely Group, P.C.

(57) ABSTRACT

A thermal protection barrier including a base layer having a high melting temperature granular media having free standing granules disposed within the base layer and a distributor grid layer having a plurality of spaced-apart distributors composed of a high melting temperature material disposed adjacent to the base layer. The spaced-apart distributors are dimensioned and configured to provide load bearing support to the thermal protection barrier prior to a breach of the thermal protection barrier and to divide and disperse a superheated flowing mass to the free standing granules of the base layer upon occurrence of a breach. In certain embodiments, the thermal protection barrier is positioned adjacent to a nuclear system such that, upon occurrence of a loss of containment accident, the distributor grid layer is positioned and configured to divide and disperse a superheated flowing nuclear mass to the free standing granules.

20 Claims, 3 Drawing Sheets

Related U.S. Application Data which is a continuation-in-part of application No. 15/040,478, filed on Feb. 10, 2016, now abandoned.

(52) U.S. Cl.
CPC .......... *B32B 33/00* (2013.01); *B32B 2250/05* (2013.01); *B32B 2264/108* (2013.01); *B32B 2264/12* (2013.01); *B32B 2266/02* (2013.01); *B32B 2307/306* (2013.01); *B32B 2313/02* (2013.01); *B32B 2313/04* (2013.01); *B32B 2315/02* (2013.01); *B32B 2571/00* (2013.01)

(56) References Cited

U.S. PATENT DOCUMENTS

| | | |
|---|---|---|
| 6,568,310 B2 | 5/2003 | Morgan |
| 7,309,807 B2 | 12/2007 | Branagan |
| 7,637,073 B2 | 12/2009 | Elliott et al. |
| 7,866,248 B2 | 1/2011 | Moore, III et al. |
| 8,371,647 B2 | 2/2013 | Ripley |
| 2005/0031843 A1 | 2/2005 | Robinson et al. |
| 2007/0181845 A1* | 8/2007 | Hernandez .............. C04B 30/02 252/62 |
| 2008/0063875 A1 | 3/2008 | Robinson et al. |
| 2009/0114083 A1* | 5/2009 | Moore, III ............ F41H 5/0492 89/36.02 |
| 2010/0236796 A1* | 9/2010 | Chattaway ............... A62C 3/08 169/46 |
| 2014/0329079 A1* | 11/2014 | Liu .......................... B32B 3/10 428/317.1 |

OTHER PUBLICATIONS

Natarajan, Heat Transfer in Vertical Granular Flows, vol. 10, Issue 2, 1997.

* cited by examiner

THERMAL PROTECTION BARRIER

CROSS-REFERENCE TO RELATED APPLICATION

This application claims priority as a continuation-in-part to co-pending U.S. application Ser. No. 15/994,055 filed May 31, 2018, and entitled "Thermal Protection Barrier for Delaying Access," which claimed priority as a continuation-in-part to U.S. application Ser. No. 15/040,478 filed Feb. 10, 2016, and entitled "Thermal Protection Barrier," the entire contents of each being incorporated by reference herein.

GOVERNMENT RIGHTS

The U.S. Government has rights to this invention pursuant to contract number DE-NA0001942 between the U.S. Department of Energy and Consolidated Nuclear Security, LLC.

FIELD

This disclosure relates to a thermal protection barrier. More particularly, this disclosure relates to a thermal protection barrier operable to extinguish/slow the advancement of a superheated flowing mass by capturing the flowing mass within a granular media layer of the protection barrier.

BACKGROUND

Various pyro-metallurgical processes require high-temperature thermal treatments to bring about physical and chemical transformation in materials. For example, thermite is well understood to cause an exothermic reaction between a metal and a metal oxide that can burn at temperatures of 2500° C. or greater. As a result, a thermite charge poses a significant threat to thermally sensitive systems and/or equipment that may be inadvertently contacted by the thermite charge. Similarly, superheated molten metals, such as a thermite charged flame, are often used to gain unlawful entry to secure locations.

In other situations, superheated flowing masses pose threats to surrounding areas. For example, during a loss of containment accident of a nuclear system, a superheated flowing nuclear mass has the potential to escape from the nuclear system. An uncontained flowing nuclear mass poses many threats to the surrounding area including radioactive contamination of the environment surrounding the nuclear system.

What is needed therefore is an effective arrangement of materials to provide an effective thermal protection barrier against superheated molten metals.

SUMMARY

According to one embodiment of the disclosure, a thermal protection barrier includes a base layer having a high melting temperature granular media disposed within the base layer, the granular media including free standing granules. A distributor grid layer having a plurality of spaced-apart distributors composed of a high melting temperature material is disposed adjacent the base layer dimensioned and configured to provide load bearing support to the thermal protection barrier prior to a breach of the thermal protection barrier and to divide and disperse a superheated flowing mass to the free standing granules of the base layer upon occurrence of a breach.

According to certain embodiments, the plurality of spaced-apart distributors of the distributor grid layer are formed at least in part of a nuclear poison material.

According to certain embodiments, the plurality of spaced-apart distributors are each spaced a substantially equal distance apart from each other.

According to certain embodiments, the distributor grid layer further includes a standoff material comprising a polymer foam disposed in the spaces between the plurality of spaced-apart distributors.

According to certain embodiments, the thermal protection barrier further includes a containment layer positioned adjacent the base layer on a side opposite the distributor grid layer, the containment layer dimensioned and configured to contain and substantially pack the free standing granular media within the base layer. In some embodiments, the containment layer is formed at least in part of at least one of carbon and a high melting temperature ceramic. In certain embodiments, the thermal protection barrier further includes a metal housing disposed around the base layer, the distributor grid layer, and the containment layer.

According to certain embodiments, the free standing granules includes a granular nuclear poison. In some embodiments, the granular nuclear poison includes granules formed at least in part of at least one of boron or gadolinium.

According to certain embodiments, the thermal protection barrier further includes a gas system fluidly connected to the base layer for delivering at least one of a fire suppressing gas for fire prevention or a fluidizing gas for fluidizing the free standing granules.

According to another embodiment of the disclosure, a method for protecting against a superheated flowing mass includes providing a thermal protection barrier including a base layer having free standing granules disposed within the base layer and a distributor grid layer having a plurality of spaced-apart distributors composed of a high melting temperature material disposed adjacent the base layer; and positioning the thermal protection barrier such that the distributor grid layer is positioned and configured to divide and disperse a superheated flowing mass to the free standing granules of the base layer upon occurrence of a breach of the thermal protection barrier.

According to certain embodiments, the method further includes delivering a fire suppressing gas to the base layer to suffocate a fire or prevent a fire from initiating during a loss of containment accident.

According to certain embodiments, the method further includes delivering a fluidizing gas to the base layer to fluidize the free standing granules during a loss of containment accident.

According to certain embodiments, the plurality of spaced-apart distributors are formed at least in part of a nuclear poison material.

According to certain embodiments, the nuclear poison material includes at least one of boron or gadolinium.

According to certain embodiments, the plurality of spaced-apart distributors are each spaced a substantially equal distance apart from each other.

According to certain embodiments, the distributor grid layer further includes a standoff material comprising a polymer foam disposed in the spaces between the plurality of spaced-apart distributors.

According to certain embodiments, the thermal protection barrier further includes a containment layer positioned adjacent to the base layer on a side opposite the distributor grid layer, the containment layer dimensioned and configured to contain and substantially pack the free standing granules within the base layer.

According to certain embodiments, the free standing granules includes a granular nuclear poison and the positioning step includes positioning the thermal protection barrier adjacent a nuclear system for dividing and dispersing a superheated flowing nuclear mass to the free standing granules of the base layer upon occurrence of a loss of containment accident to reduce the effective neutron multiplication factor of the nuclear mass. In some embodiments, the granular nuclear poison includes granules formed at least in part of at least one of boron and gadolinium.

BRIEF DESCRIPTION OF THE DRAWINGS

Various advantages are apparent by reference to the detailed description in conjunction with the figures, wherein elements are not to scale so as to more clearly show the details, wherein like reference numbers indicate like elements throughout the several views, and wherein.

DETAILED DESCRIPTION

In the following detailed description of the preferred and other embodiments, reference is made to the accompanying drawings, which form a part hereof, and within which are shown by way of illustration the practice of specific embodiments of the disclosure. It is to be understood that other embodiments may be utilized, and that structural changes may be made and processes may vary in other embodiments.

Figure 1:
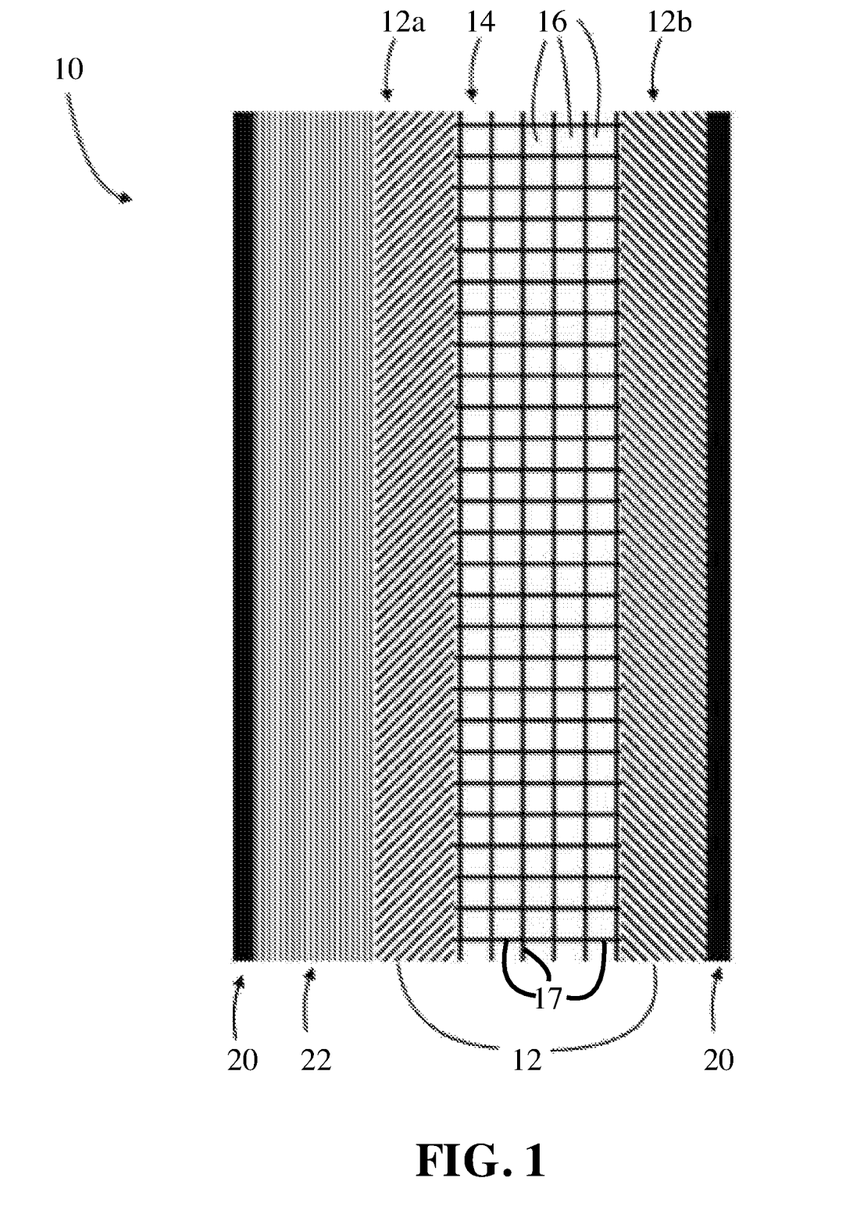
FIG. 1 depicts a cross sectional view of a thermal protection barrier according to one embodiment of the disclosure.

Referring to FIG. 1, the present disclosure broadly relates to a thermal protection barrier 10 preferably including one or more rigid heat resistant layers 12 preferably formed of carbon (and more preferably graphite due to its material properties and lower cost relative to other forms of carbon), a high temperature ceramic including, but not limited to, zirconia, alumina, silicon carbide, and boron carbide, and combinations thereof. In operation, the one or more heat resistant layers 12 generally require significant heat and time, such as from a continuous thermite flame, to penetrate or otherwise defeat each layer 12. In certain embodiments, the heat resistant layers 12 include a high temperature ceramic sandwiched between sheets of graphite or other form of carbon.

Adjacent to at least one of the heat resistant layers 12 is a cellular base layer 14 preferably formed of a plurality of interconnected baffles 16 each having at least one perforated wall 17 that the baffle 16 shares with an adjacent baffle 16. The interconnected baffles 16 are preferably formed in the form of a series of triangles, squares, hexagons, or other repeating structures sandwiched between a first heat resistant layer 12a and a second heat resistant layer 12b. Disposed within each of the baffles 16 of the cellular base layer 14 is a granular media having a high melting temperature and sufficiently sized to slowly flow in its solid form through the perforations of the base layer 14 (i.e., through the perforated walls 17 of the baffles 16) upon breach of the base layer 14 in a manner similar to how sand flows through an hour glass. For purposes herein, it is considered a breach of the base layer 14 once a thermal threat reaches the base layer 14 of the thermal protection barrier 10. In preferred embodiments, the granular media includes silica sand, alumina sand, magnesia sand, silicon carbide, and combinations thereof. It is noted that the base layer 14 filled with granular media also provides stiffness and rigidity to the chosen configuration of the thermal protection barrier 10.

In preferred embodiments, the baffles 16 are sufficiently "packed" with "free standing" granules of a high melting temperature granular media. The granules are referred to as being "packed" because flow of the granular media through the perforations of the baffle walls 17 is substantially prevented unless there is a breach of the base layer 14 or, as explained below, the thermal protection barrier 10 is exposed to a blast or other type of shock wave that provides sufficient force to cause movement of the granular media. The granules are referred to as being "free standing" because they are not suspended within or otherwise surrounded by any type of resin, slurry or other suspension medium, or structure that prevents independent flow of the granules. Stated another way, the granules are "free standing" because the baffles 16 contain only granules and gas. On the other hand, as exemplified further below particularly with respect to FIG. 2, if the heat resistant layer 12 is penetrated by a thermal threat sufficiently to reach the base layer 14, the "free standing" granules are "released" by the breach (i.e., the "packed" nature of the granules within the baffles 16 no longer exists) such that the granular media can flow through appropriately sized perforations in the walls 17 of the baffles 16 at a relatively controlled rate towards the breach.

In operation, once the heat resistant layer 12a of the thermal protection barrier 10 is penetrated sufficiently by a thermal threat such as a thermite charge so that a breach of the base layer 14 occurs, the granular media flows toward the charge from the baffles 16 proximate to where the breach occurred. As a result, the granular media will absorb heat and extinguish or slow the advancement of the thermal threat. Further, once the granular media begins to flow towards the threat from the baffles 16 proximate to the breach, the granular media from remote baffles 16 will continually flow through the perforations in the baffle walls 17 of the base layer to the baffles 16 proximate to the breach to replenish the granular media that is extinguishing/slowing/thwarting the advancement of the thermal threat. This replenishing continues until all the granular media able to flow towards the breach has flowed out of the base layer 14. In certain embodiments, particularly when the thermal protection barrier 10 is used to protect thermally sensitive systems from superheated molten metals, the granular media may also exploit a phase change (e.g., from silica sand to a molten glass) when the granular media reaches the baffles 16 proximate the breach to absorb heat from the superheated molten metal and help prevent the superheated metal from defeating the thermal protection barrier 10 or otherwise accessing the area beyond the thermal protection barrier 10.

Figure 2:
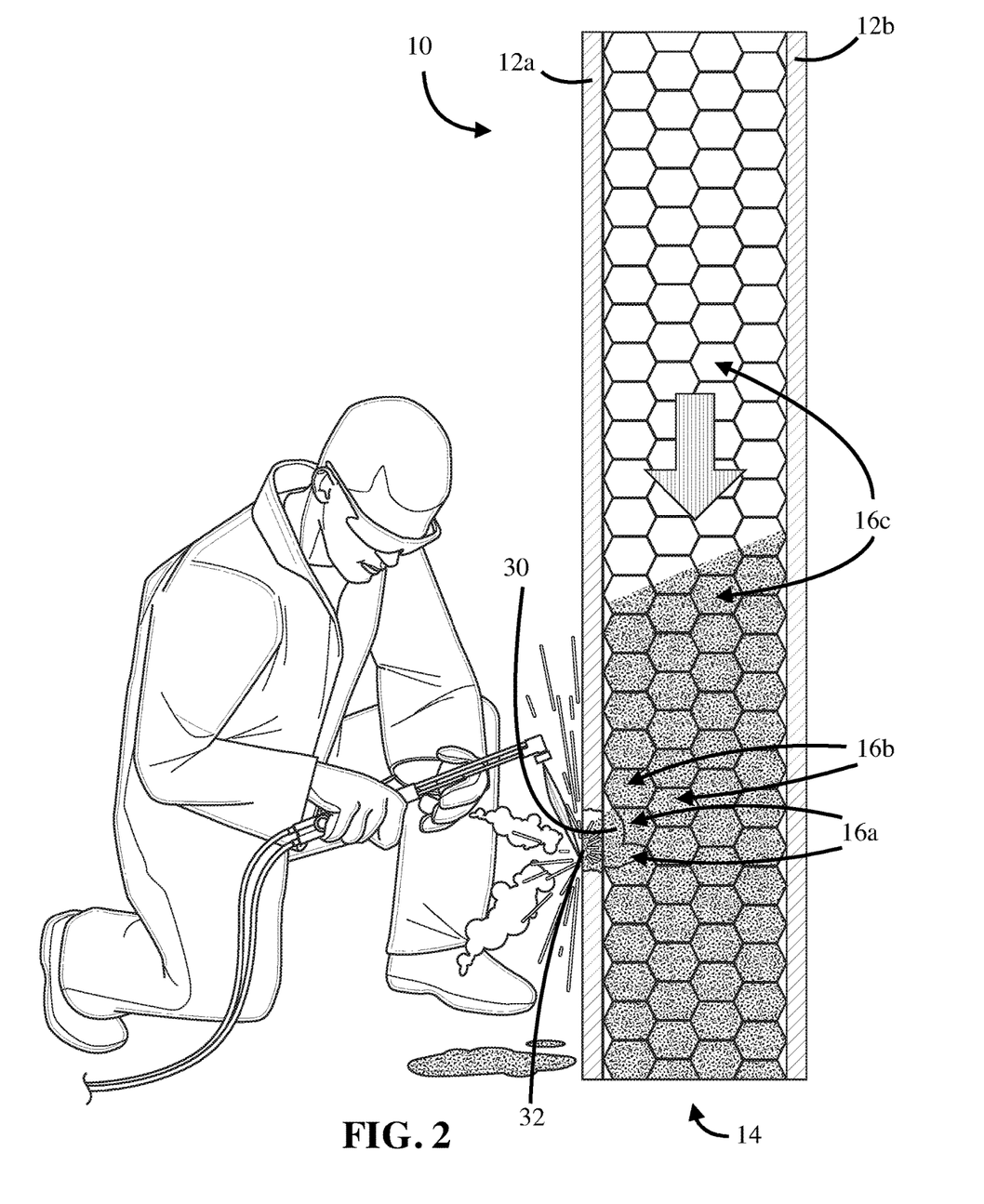
FIG. 2 depicts a cross sectional view of a thermal protection barrier as it is being breached by an intruder and the granular media is flowing within the base layer towards the breach according to one embodiment of the disclosure.

Referring to FIG. 2, it is contemplated that one exemplary embodiment of the thermal protection barrier 10 is a security door or similar structure in which an intruder attempts to gain access using a thermal flame. According to this embodiment, the heat resistant layer 12a acts as an initial barrier to burning through the door with the thermal flame. When an intruder successfully penetrates the heat resistant layer 12a of the security door so as to breach base layer 14 as represented by breach 30, the granular media 32 will extinguish/thwart the thermal flame by flowing out of baffles 16a of the cellular base layer 14 proximate to the area of the breach 30. The granular media will then continue to flow from adjacent baffles 16b into the baffles 16a that are proximate the breach 30 (principally adjacent baffles 16b above and beside the immediate area of the breach 30) to continue extinguishing/thwarting the thermal flame at the breach 30. As the granular media from baffles 16a proximate the breach and baffles 16b adjacent the breach flows towards the breach 30, granular media will flow from baffles 16c remote from the breach towards the breach 30. This controlled flow from remote baffles 16c towards the breach 30 will result in continued extinguishing/thwarting of the thermal flame until the volume of granular media that is able to flow from remote baffles 16c to the breach is exhausted.

As should be understood in reference to FIG. 2, each of the baffles 16 of base layer 14 were initially "packed" with the "free standing" granular media 32. Thus, the "empty" and "partially empty" remote baffles 16c shown in FIG. 2 above the breach signify that the intruder has been attempting to gain access to barrier 10 for a significant amount of time due to the controlled flow of the media 32 from the remote baffles 16c towards the breach 30. Further, the "empty" remote baffles 16c signify how the granular media 32 from a remote and undamaged area of the base layer 14 is able to flow towards the breach 30 due to the "free standing" nature of the granular media and appropriately sized perforations in the undamaged baffle walls 17.

If the intruder somehow successfully defeats the base layer 14 before an armed response arrives, the intruder preferably encounters another heat resistant layer 12b, which requires additional time and/or a different type of tool to defeat. Accordingly, thermal protection barrier 10 provides significant time delay for security personnel to respond to an attempted defeat of the security structure.

According to certain embodiments, the gas within base layer 14 is intended to help suppress the thermal threat. For example, the thermal protection barrier may include a fire suppressing gas, for example a noble gas such as nitrogen, argon, and/or carbon dioxide, which helps to reduce oxygen levels around a fire when released from the base layer 14. In embodiments where the gas within the base layer 14 is intended to help suppress a thermal threat, the thermal protection barrier 10 may further include a sealing layer intended to help contain the gas within the base layer 14 until a breach occurs. According to some embodiments, the base layer 14 may also be connected to an external gas system that is designed to introduce a fire suppressing gas to the base layer 14 upon a breach. For example, with reference to FIG. 2, a gas system may be connected to the base layer adjacent a portion of a security door. When a breach is detected, the gas system introduces a noble gas to the interconnected baffles 16c. Optionally, the gas may be introduced under pressure. When a gas system is connected to a top portion of a security door, the noble gas then flows with the free standing granular media 32 towards the breach 30. When a gas system is connected at or near the bottom portion of a security door and the gas (either a fire suppressing gas or a non-fire suppressing gas such as air) is introduced under sufficient pressure, the resulting fluidized bed aids the flow of the free standing granular media 32 towards the breach 30.

According to some embodiments, the thermal protection barrier 10 includes a plurality of base layers 14 substantially as described above sandwiched between heat resistant layers 12. For example, the thermal protection barrier may include a first heat resistant layer 12a, first base layer 14, second heat resistant layer 12b, and another base layer disposed on the end of the second heat resistant layer 12b opposite from the first base layer 14. According to this embodiment, the thermal protection barrier provides successive layers of flowable granular media. In other words, once an intruder defeats the second heat resistant layer 12b and breaches the second base layer, yet another flow of granular media is encountered from the second base layer. Depending on the relative thickness of the layers and the size of the breach area, it is noted granular media may flow between the first and second base layers when the second heat resistant layer 12b is defeated.

According to embodiments in which the thermal protection barrier 10 is used for security purposes, it is also noted that the granular media within the base layer 14 serves as an effective blast resistant barrier. In this regard, the granular media is operable to spatially spread the force exerted on the thermal protection barrier 10 by allowing the granular media to flow within the baffles 16 when base layer 14 is breached or to move without flowing when base layer 14 is not breached. This spatial spreading of the granular media away from the direction of the blast absorbs a significant portion of the energy of the blast and causes the force to be applied over a larger surface area. In addition to spatially spreading the force applied to the thermal protection barrier 10 from an explosion, the granular media spreads the applied force over time by requiring the transmission of the force from particle to particle of the granular media. This energy transfer takes far more time than transfer of such energy through a solid material. Further, individual particles, after becoming nearly fully compacted, typically absorb further energy from the blast by being displaced in a direction that is generally transverse to the initial force. This partial re-direction of the force delays the transfer of energy and reduces the peak level of energy that is received by the thermal protection barrier 10 from a blast.

In a related embodiment, thermal protection barrier 10 is positioned to protect thermally sensitive systems and equipment from damage by excessive heat and inadvertent contact with superheated molten metals during metallurgical processes. For example, thermal protection barrier 10 may be placed over a thermally sensitive system intended to be protected while a metallurgical process is being performed in the area adjacent to the system. As explained above, the flowing granular media of the thermal protection barrier 10 serves to contain and shunt the damaging concentration of heat from any superheated metal that would have unintentionally contacted the thermally sensitive system if not for the thermal protection barrier 10. This containing/shunting provides time for the superheated metal to cool before completely defeating the thermal protection barrier 10 and/or time for an operator to recognize and treat the potential defeat by other means, such as a fire extinguisher. As noted above, when exposed to very high temperatures, the granular media will also exploit a phase change (e.g., from silica sand to a molten glass) to absorb heat from the superheated molten metal and prevent the metal from completely defeating the thermal protection barrier 10.

Referring again to FIG. 1, thermal protection barrier 10 typically includes additional layers adjacent to the heat resistant layers 12 and cellular base layer 14. In preferred embodiments and as shown in FIG. 1, thermal protection barrier 10 further includes a housing 20 made of steel, aluminum, or similar materials for sealing the various layers of the thermal protection barrier together. One or more standoff layers 22 may also be provided to provide "empty space" for additional blast resistance or, when replacing one or more of the heat resistant layers 12, to provide a barrier adjacent the base layer 14 to prevent the flow of granular media prior to a breach. In preferred embodiments, the standoff layers 22 are formed of expanded polymer foam or similar material as known in the art such as polystyrene, polyurethane, or polyethylene.

According to embodiments where the thermal protection barrier 10 is intended to be blast resistant, such as the security door described above, a standoff layer 22 is preferably disposed between the housing 20 and the heat resistant layer 12a. According to this embodiment, the shock wave from the blast will penetrate the steel housing 20 by creating a hole in the housing 20, or simply by passing through the housing 20, and start to lose energy as it enters the foamed space between the steel housing 20 and the heat resistant layer 12a. Once the shockwave fills up the "empty" space of standoff layer 22, the shockwave will travel to the one or more cellular base layers 14 where the granular media will sufficiently absorb what remains of the shockwave as described above so that any unexpended energy will be directed back towards the origin of the explosion. This should effectively reduce the blast to the point where it does not sufficiently penetrate the entire thickness of the thermal/security barrier itself so as to defeat the thermal/security barrier.

In summary, thermal protection barrier 10 utilizes a series of successive layers to address various types of assaults and dangers to thermally sensitive systems posed particularly from superheated molten materials. More specifically, thermal protection barrier 10 includes a base layer 14 of flowable granular media that exploits the latent heat absorption/fusion from the flowing granular media for thermal management. It should be understood that the layers of the protection barrier 10 described above can be varied as desired within the spirit of the disclosure and easily combined in barriers of varying size and shapes to protect any number of potential structures or to form part of a structure that itself is thermally protected (e.g., security door, safe, walls and steel beams for buildings, etc.).

An alternate embodiment of the present disclosure provides a thermal protection barrier designed to be positioned or otherwise incorporated into a more horizontal type system such as a floor where the free standing granules are positioned horizontally with respect to the barrier instead of vertically as shown in FIGS. 1 and 2. It should be understood that the features of this embodiment could be incorporated into other structures that are not necessarily horizontal such as a sloping floor or sidewalls of a containment structure. According to this embodiment, the free standing granules of the barrier are positioned to receive/capture a superheated flowing mass during a breach to help prevent continued spread of the flowing mass past the barrier. As described further below, this embodiment is particularly desirable as a thermal protection barrier for nuclear systems such as nuclear power generation systems by adding a nuclear poision to the free standing granules of the granular media.

Figure 3:
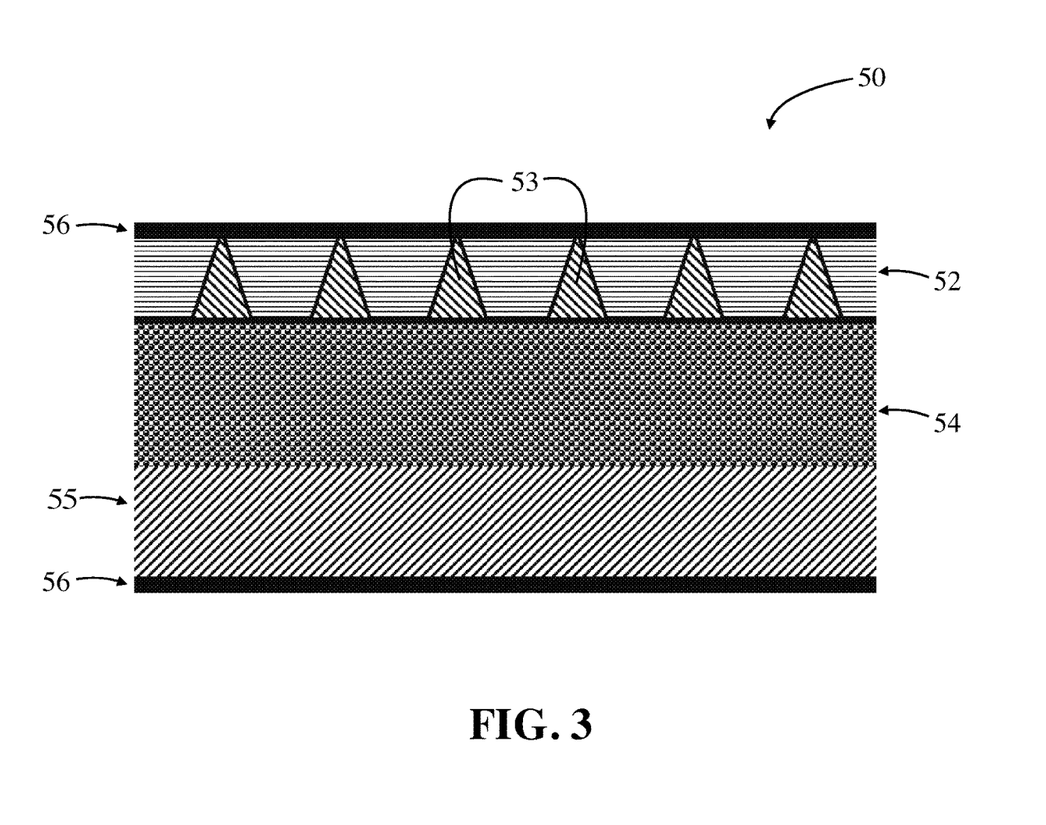
FIG. 3 depicts a cross sectional view of a thermal protection barrier according to another embodiment of the disclosure.

Referring to FIG. 3, a preferred thermal protection barrier 50 incorporated into a horizontal system is exemplified. According to this embodiment, a load-bearing distributor plate or grid layer 52 having a plurality of distributors 53 composed of a high melting temperature material such as steel, carbon, boron carbide, silicon carbide, boron nitride, gadolinium oxide, etc. is disposed on one side of the base layer 54 and a carbon (e.g., graphite) or high temperature ceramic containment layer 55, similar to the heat resistant layer 12 described above in barrier 10, is disposed on the other side of the base layer 54 opposite the distributor grid layer 52. The containment layer 55 is operable to contain and sufficiently pack a granular media mixture of free standing granules within the base layer 54. The granular media mixture preferably includes free standing silica sand, alumina sand, magnesia sand, silicon carbide granules, and combinations thereof. In embodiments in which the barrier is intended to protect a nuclear system, the granular media mixture may further include a stable, high melting temperature, granular nuclear poison such as boron, boron nitride, or gadolinium. The base layer 54 may further include a gas such as a fire-suppressing gas as described above with respect to thermal protection barrier 10.

In operation, and using protection of a nuclear system as an example, the thermal protection barrier 50 is positioned in the flooring adjacent the nuclear system. The load-bearing distributor grid layer 52 provides sufficient load-bearing support such that the barrier 50 is operable to act as a floor during normal operations. On the other hand, upon breach of the barrier 50 by a superheated flowing nuclear mass (e.g., a "loss of coolant/containment accident" or LOCA), the distributor grid layer 52 is configured to assist in dividing and dispersing the superheated flowing nuclear mass to the granular media mixture of base layer 54. In certain embodiments, and as exemplified in FIG. 3, the plurality of distributors 53 are evenly spaced from each other so as to help promote the even distribution of the nuclear mass to the granular media mixture.

As the nuclear mass spreads over the grid layer 52 and into the granular media of the base layer 54, the heat from the mass is quickly robbed as the mass tries to overcome the heat of fusion of the grid layer material and granular media resulting in the mass becoming quickly quenched. Depending on the temperature/speed of the flowing mass and the material properties of the grid layer 52 (e.g., melting temperature), the grid layer 52, or portions thereof, may also melt while robbing the heat from the mass. In this situation, the melted grid layer 52 material mixes with the free standing granules of base layer 54 to continue robbing heat from the nuclear mass until the mass is quenched. Thus, in preferred embodiments in which the barrier 50 is intended to protect a nuclear system, the grid layer 52 is preferably formed of or otherwise contains a nuclear poison material such as boron, boron nitride, boron carbide, or gadolinium oxide, or a combination thereof.

Once portions of the flowing mass are quenched, the quenched portions allow spreading of the remaining molten nuclear mass through the base layer 54 until the effective neutron multiplication factor (k) of the nuclear mass drops well below 1. In addition, the nuclear poison further reduces the effective neutron multiplication factor of the thermal mass. As a result, by distributing the flowing mass to the mixture of base layer 54, the barrier 50 is able to prevent localized "burn through" of the thermal mass in a particular region of the base layer 54 and the molten mass is able to be quenched into a slab-like geometry. This helps prevent further spreading of the nuclear mass similar to how flowing lava solidifying on its front end as it cools acts as a barrier for the lava behind the solidification.

In embodiments where the base layer 54 includes a fire suppressing gas, the fire-suppressing gas helps suffocate a fire or otherwise prevent a fire from initiating from the flowing nuclear mass. In certain embodiments, a gas system may be connected to the base layer 54 to provide a flowing gas to fluidize and disperse the free standing granules of the granular media through the base layer 54. For example, a gas system may be connected to the bottom of the base layer 54 for providing a fluidized bed of granular media.

As noted above, barrier 50 preferably includes a metal housing layer 56. Together, the housing layer 56 and distributor grid layer 52 are designed to contain the media mixture while allowing the superheated flowing mass to pass quickly into the interior of the thermal protection barrier 50 where it is attacked by the granular media of base layer 54. In preferred embodiments, the grid layer 52 further includes a standoff material such as expanded polymer foam or similar material such as polystyrene, polyurethane, or polyethelyne disposed in open space within the distributor grid layer 52 to act as a void filler and prevent the granular media mixture of base layer 54 from shifting within barrier 50. The standoff material is selected such that it provides structural support for the barrier but quickly vaporizes upon contact with a superheated flowing mass such that the flowing mass is able to traverse the grid layer 52 and mix with the granular media mixture of base layer 54. In other words, the distributors 53 and standoff material of grid layer 52 are configured to provide structural support for the barrier 50 while containing the granular media of base layer 54 prior to a breach/LOCA event while permitting a flowing mass to be introduced to the granular media of base layer 54 upon a breach.

While thermal protection barrier 50 described above is designed to be particularly suited for protecting nuclear systems, it should be understood that it could also be used to protect other temperature sensitive systems. In particular, thermal protection barrier 50 is particularly suited to protect temperature sensitive systems when there is the potential for a superheated flowing mass of molten metal to break containment by evenly distributing the flowing mass to the granular media. When there is no potential for a nuclear threat, the nuclear poison can be omitted from the granular media 54 and/or grid layer 52 to reduce costs.

The foregoing descriptions of embodiments have been presented for purposes of illustration and exposition. They are not intended to be exhaustive or to limit the embodiments to the precise forms disclosed. Obvious modifications or variations are possible in light of the above teachings. The embodiments are chosen and described in an effort to provide the best illustrations of principles and practical applications, and to thereby enable one of ordinary skill in the art to utilize the various embodiments as described and with various modifications as are suited to the particular use contemplated. All such modifications and variations are within the scope of the appended claims when interpreted in accordance with the breadth to which they are fairly, legally, and equitably entitled.

What is claimed is:

1. A thermal protection barrier comprising: a flooring system including a load bearing distributor grid layer having a plurality of spaced-apart distributors composed of a high melting temperature material; and a base layer disposed below the distributor grid layer, the base layer having a high melting temperature granular media including free standing granules disposed within the base layer, wherein, upon occurrence of a superheated mass flowing over the flooring system, the flooring system is dimensioned and configured to allow the superheated mass to pass quickly into the base layer while the plurality of spaced-apart distributors of the flooring system are dimensioned and configured for dividing and dispersing the superheated mass along the free standing granules of the base layer such that the superheated mass becomes quenched and localized burn through of the base layer is prevented.

2. The thermal protection barrier of claim 1 wherein the plurality of spaced-apart distributors are formed at least in part of a nuclear poison material.

3. The thermal protection barrier of claim 1 wherein the plurality of spaced-apart distributors are each spaced a substantially equal distance apart from each other.

4. The thermal protection barrier of claim 1 wherein the distributor grid layer further includes a standoff material comprising a polymer foam disposed in the spaces between the plurality of spaced-apart distributors.

5. The thermal protection barrier of claim 1 further comprising a containment layer positioned adjacent the base layer on a side opposite the distributor grid layer, the containment layer dimensioned and configured to contain and substantially pack the free standing granular media within the base layer.

6. The thermal protection barrier of claim 5 wherein the containment layer is formed at least in part of at least one of carbon and a high melting temperature ceramic.

7. The thermal protection barrier of claim 5 further comprising a metal housing disposed around the base layer, the distributor grid layer, and the containment layer.

8. The thermal protection barrier of claim 1 wherein the free standing granules includes a granular nuclear poison.

9. The thermal protection barrier of claim 8 wherein the granular nuclear poison includes granules formed at least in part of at least one of boron or gadolinium.

10. The thermal protection barrier of claim 1 further comprising a gas system fluidly connected to the base layer for delivering at least one of a fire suppressing gas for fire prevention or a fluidizing gas for fluidizing the free standing granules.

11. A method for protecting a thermally sensitive system against a superheated flowing mass, the method comprising:
    providing a thermal protection barrier according to claim 1; and
    positioning the thermal protection barrier such that the distributor grid layer is positioned and configured to divide and disperse the superheated flowing mass to the free standing granules of the base layer upon occurrence of a breach of the flooring system of the thermal protection barrier to prevent the superheated flowing mass from contacting the thermally sensitive system.

12. The method of claim 11 further comprising delivering a fire suppressing gas to the base layer to suffocate a fire or prevent a fire from initiating during a loss of containment accident.

13. The method of claim 11 further comprising delivering a fluidizing gas to the base layer to fluidize the free standing granules during a loss of containment accident.

14. The method of claim 11 wherein the plurality of spaced-apart distributors are formed at least in part of a nuclear poison material.

15. The method of claim 14 wherein the nuclear poison material includes at least one of boron or gadolinium.

16. The method of claim 11 wherein the plurality of spaced-apart distributors are each spaced a substantially equal distance apart from each other.

17. The method of claim 11 wherein the distributor grid layer further includes a standoff material comprising a polymer foam disposed in the spaces between the plurality of spaced-apart distributors.

18. The method of claim 11 wherein the thermal protection barrier further comprises a containment layer positioned adjacent to the base layer on a side opposite the distributor grid layer, the containment layer dimensioned and configured to contain and substantially pack the free standing granules within the base layer.

19. The method of claim 11 wherein the free standing granules includes a granular nuclear poison and the positioning step includes positioning the thermal protection barrier adjacent a nuclear system for dividing and dispersing a superheated flowing nuclear mass to the free standing granules of the base layer upon occurrence of a loss of containment accident to reduce the effective neutron multiplication factor of the nuclear mass.

20. The method of claim 19 wherein the granular nuclear poison includes granules formed at least in part of at least one of boron and gadolinium.

* * * * *